Jan. 14, 1969  R. J. PARKER  3,422,294
PERMANENT MAGNET STATOR FOR DYNAMOELECTRIC MACHINES
AND METHOD OF ASSEMBLING THE SAME
Filed Sept. 1, 1966

INVENTOR
ROLLIN J. PARKER

BY Harold J. Holt

ATTORNEY

United States Patent Office 3,422,294
Patented Jan. 14, 1969

3,422,294
PERMANENT MAGNET STATOR FOR DYNAMO-
ELECTRIC MACHINES AND METHOD OF AS-
SEMBLING THE SAME
Rollin J. Parker, Greenville, Mich., assignor to General
Electric Company, a corporation of New York
Filed Sept. 1, 1966, Ser. No. 576,662
U.S. Cl. 310—42        7 Claims
Int. Cl. H02k 15/00; H02k 23/04; H02k 1/12

This invention relates to a stator and method of assembling same, and more particularly to a stator useful in a permanent magnet type of fractional horsepower motor.

Permanent magnets used in the manufacture of stators for small-size dynamoelectric machines, such as fractional horsepower motors, are conventionally formed through a casting process which includes casting a string of magnets, each separated a short distance from the next, but interconnected by a bridge of metal. The magnets are broken apart at the bridge, the material of which forms a rough projection on the magnet. Such magnets are relatively rough and of slightly varying thicknesses. Hence, in order to obtain accurate air gaps between the magnets and the armature, expensive machining and grinding of the magnets are required.

Hence, it is an object of this invention to provide a stator and a method of assembling same, which permits as-cast magnets to be used and which includes utilization of the scrap, bridge forming, projections on the magnet as a means for accurately mounting the magnet and which stator includes simplified end assembly rings which accurately position the inner surface of the magnet relative to the armature to form the predetermined air gap, and including utilizing the outer casing or housing as a means for positioning the magnet properly with respect to the armature.

A further object of this invention is to provide a method of assembling a stator which eliminates the need for shims or mandrels, but rather includes end rings having shoulder portions which function to precisely locate the inner curved surfaces of the magnets relative to the motor armatures.

These and other objects and advantages of this invention will become apparent upon reading the following description of which the attached drawings form a part.

Figure 1:
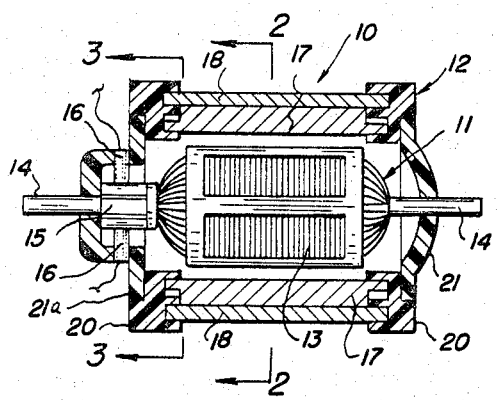
FIG. 1 is a cross-sectional elevational view of the stator herein, with an armature positioned therein.
Figure 2:
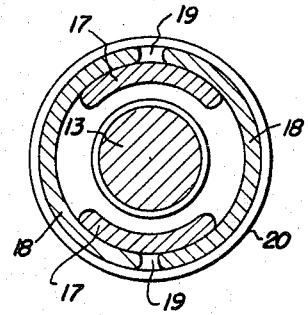
FIG. 2 is a cross-sectional view taken in the direction of arrows 2—2 of FIG. 1.

As shown in FIG. 1, the fractional horsepower or dynamoelectric machine 10 includes a rotor 11 and a stator 12. The rotor comprises a conventional armature 13 mounted upon a shaft 14 and having a commutator 15 upon which brushes 16 engage.

The motor illustrated includes a pair of oppositely arranged permanent magnets 17 each arcuate in cross section and elongated so as to match the length of the armature.

A casing or housing surrounds the magnets and armature, such casing being formed of arcuately curved frame segments 18 which are gapped or split apart at 19 to form a segmented or split casing. Each of the segments is made of a magnetically permeable material so as to function as a flux return path.

The stator parts are assembled together by means of end rings 20 to which are secured end caps 21 and 21a, which alternatively may be formed integrally with their respective rings.

One end cap 20 closes one end of the casing and has an opening through which the shaft 14 projects. The opposite end cap 21a mounts the brushes 16 and also provides a passageway for the opposite end of the shaft 14.

These end rings and end caps preferably are formed of a thermoplastic resinous material, and particularly useful is one that will shrink or deform to a limited degree upon the application of heat. A number of suitable plastics are available, examples being nylon, polystyrene of polycarbonate resins such as that sold under the trademark "Lexan."

The small-size permanent magnets contemplated herein, normally alnico, are formed by casting a string of magnets at one time. In the casting process, the magnets are individually separated but are interconnected by a bridge or section of metal which actually is formed in the casting process as the metal travels from one magnet mold into the next through an interconnecting passageway. In such magnets the connecting bridge of metal is conventionally formed coplanar with the outer curved surface of the magnet and is of a narrower thickness of the magnet so that it may be easily broken apart in order to separate the individual magnets, leaving a stub of scrap material integral with the magnets.

Figure 4:
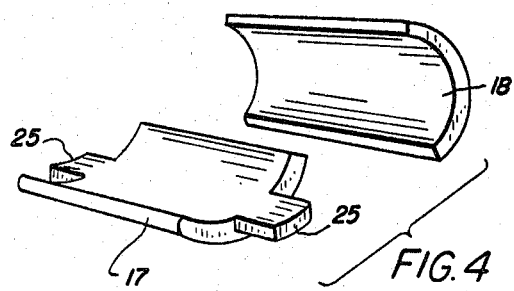
FIG. 4 is a perspective view showing a single magnet and its adjacent casing segment.
Figure 6:
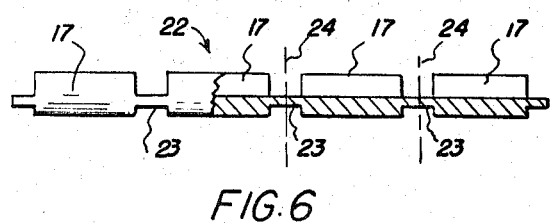
FIG. 6 is an elevational view, partially in section, and drawn to a smaller scale of a "string" of as-cast magnets.

The invention herein contemplates using such stub of scrap material as a means for properly mounting the magnets, and to that end the bridge connection 23 (see FIG. 6) is made coplanar with the inner arcuate surface of the magnet, rather than the conventionally used outer arcuate surface. After casting, the bridge material 23 is broken apart, as indicated by the dotted lines 24, to form the separate magnets leaving the scrap stub. These then form end tabs 25 (FIG. 4) extending outwardly from the opposite ends of the magnets and coplanar with the inner surface thereof.

Figure 3:
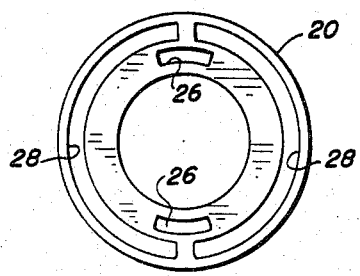
FIG. 3 is an inner end view of an end ring, taken as if in the direction of arrows 3—3 of FIG. 1.

As shown in FIG. 3, each of the end rings 20 is formed with inner or tab grooves 26 which are circumferentially equal in width to the circumferential width of the tabs 25 for receiving such tabs closely and preventing sidewise shifting of the magnets relative to the caps and to the rings. The inner wall portion of these grooves is accurately formed and accurately dimensioned to provide shoulders 27 which will accurately locate the adjacent edge of the magnet relative to the axis of the ring, and, of course, thereby relative to the armature of the motor to provide the predetermined air gap.

Figure 5:
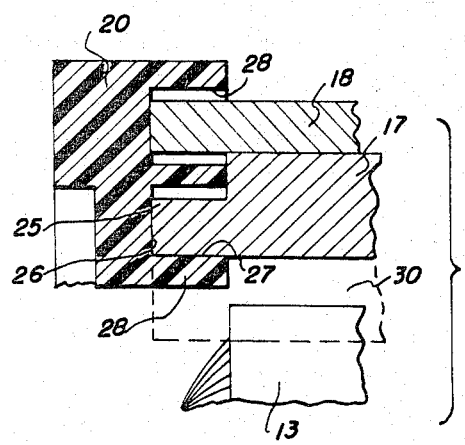
FIG. 5 is an enlarged cross-sectional view of a fragment of the assembly.

The rings are also provided with outer grooves 28 which receive the end portions of the casing segments 18 and (see FIG. 5) which are sufficiently wide in cross section to permit radial movement of the segments inwardly towards the axis of the ring.

Thus, the ring inner peripheral edge in effect forms a shim portion or locater portion 28 which will so position the magnets 17 as to provide an accurately predetermined air gap 30.

In assembling the stator, essentially the following steps are taken: First, the magnets are broken off their string, then the end tabs 25 of a pair of magnets are inserted into the inner grooves 26 of a pair of end rings. At the same time, the segments 18 are also inserted into the outer grooves 28 of the end rings.

After axially aligning the two rings 20, the segments 18 are radially squeezed inwardly under force so as to clamp the inner faces of the tabs tightly against the shoulders 27. Despite variations in thickness of the various magnets used, the net result of this inward squeezing of this segment is that the inner surfaces of the magnets will be accurately positioned so as to provide the required air gap 30.

At that point, the segments 18 are fixed to the rings and this can be accomplished by means of a suitable adhesive or by heat-sealing the two together.

Where the rings are formed of a heat deformable thermoplastic resin, as preferred, heat applied to the outer periphery of the rings will cause deformation so as to frictionally clamp and seal against the segments 18 and thereby permanently lock them into place.

The rings 20 position the parts accurately and, in addition, position the split or gap between each of the segments 18 so that it is located at the area of zero flux of the magnets to thereby avoid interfering with the normal magnetic flux flow through the segments which form the flux return path.

The above-described construction may be modified by enlarging the inner groove 26 so as to receive the entire edge portion of the opposite ends of the magnet and the grooves 26 and 28 may be opened into each other to provide the contact between the segments and the magnets. However, this modification has a disadvantage of requiring a longer magnet to be used, whereas by utilizing the scrap bridge connection portions, the magnet may be formed the same length of the armature, thereby saving magnetic material.

After the stator has been assembled, the end caps and rotor or armature may be added to form the complete motor. Where the end caps and rings are formed integrally, then the rotor must be assembled at the same time as the stator is assembled.

This invention may be further developed within the scope of the following claims. Accordingly, it is desired that the foregoing description be read as being merely illustrative of an operative embodiment of this invention, and not in a strictly limited sense.

What I claim as new and desire to secure by Letters Patent of the United States is:

1. A stator for a dynamoelectric machine comprising an arcuately curved in cross-section permanent magnet having an outer curved face, an inner curved face adapted to be arranged adjacent the surface of a rotor, and opposite end portions aligned coplanar with said inner curved face;
    a pair of end rings adapted to be arranged axially concentric with the axis of the rotor with the magnet arranged between the rings;
    a longitudinally split casing formed of a magnetically permeable material and formed of a size to encircle the magnet and rotor;
    each of said rings having an inner groove formed to receive an end portion of said magnet and an outer groove formed to receive an end portion of said casing, with the inner wall of the inner groove being accurately spaced relative to the axis of the rotor to form a positioning shoulder for accurately positioning the inner face of the magnet relative to the rotor for providing a predetermined, accurate air gap therebetween;
    the casing being radially inwardly movable within its grooves to tightly contact the magnet outer face and thereby force the magnet end portions radially inwardly and tightly against said positioning shoulders; and
    means for fixing the casing relative to the rings for fixing the magnet end portions against said positioning shoulders.

2. A stator as defined in claim 1, and said magnet end portions comprising narrow end tabs integrally cast with the magnet and having an inner face arranged coplanar with the magnet;
    said inner grooves being of a circumferential length substantially equal to the width of said tabs to closely receive the tabs and hold them against circumferential movement;
    said outer grooves being normally larger than the thickness of said casing edge portions for radially inward movement of the casing edge portions relative to the rings;
    and said magnets being in an as-cast condition, wherein variations from a standard thickness of the magnet are compensated for by radial movement of the casing.

3. A stator as defined in claim 2, and including at least two substantially identical, oppositely arranged magnets, and additionally identically formed inner grooves formed in said rings and receiving the tabs of said magnet, thereby forming an accurately predetermined air gap relative to a rotor positioned concentrically within said rings.

4. A stator as defined in claim 2, and the body of said magnet being the same length as said rotor, with said tabs thereby extending the overall length of said magnet so that the full length of said magnet may be longitudinally aligned with the full length of said rotor.

5. A method for assembling a stator formed of at least one arcuately curved in cross-section permanent magnet having an inner face adapted to be closely spaced a predetermined distance from a rotor surface, an outer face, and end portions arranged coplanar with said inner face, and a pair of end rings each having an inner groove, and a casing formed of separated, arcuately curved segments, comprising the steps of:
    inserting the opposite end portions of the magnet within the ring inner grooves and the opposite ends of the casing segments within the outer grooves and axially aligning the rings;
    moving said segments radially inwardly to tightly clamp the magnet end portions against said shoulder forming walls; and
    fixing the rings to said casing segments to thereby fix the magnet end portions tightly against said shoulders for accurately positioning the magnet inner face relative to the axes of the rings.

6. A method as defined in claim 5, wherein said rings are formed of a thermoplastic resin, and said step of fastening the rings to the casing segments comprises heat-sealing same together.

7. A method as defined in claim 6, and said thermoplastic resin being characterized by being heat deformable wherein the step of heat-sealing includes deforming the ring at the outer groove portion only, radially inwardly, to tightly clamp the casing segments against the outer face of the magnet.

References Cited

UNITED STATES PATENTS

| | | | |
|---|---|---|---|
| 2,513,226 | 6/1950 | Wylie | 310—154 |
| 2,716,709 | 8/1955 | Rowe | 310—254 |
| 3,100,270 | 8/1963 | Case et al. | 310—154 |
| 3,234,417 | 2/1966 | Somers et al. | 310—154 |

WARREN E. RAY, *Primary Examiner.*

U.S. Cl. X.R.

29—596; 310—154, 259